(12) United States Patent
Ogiso

(10) Patent No.: US 7,626,487 B2
(45) Date of Patent: Dec. 1, 2009

(54) ANTITHEFT SYSTEM

(75) Inventor: Haruhiko Ogiso, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 489 days.

(21) Appl. No.: 10/535,980

(22) PCT Filed: Jun. 11, 2004

(86) PCT No.: PCT/JP2004/008191

§ 371 (c)(1),
(2), (4) Date: May 25, 2005

(87) PCT Pub. No.: WO2004/110832

PCT Pub. Date: Dec. 23, 2004

(65) Prior Publication Data

US 2006/0090204 A1 Apr. 27, 2006

(30) Foreign Application Priority Data

Jun. 12, 2003 (JP) ............................. 2003-167728

(51) Int. Cl.
*B60R 25/10* (2006.01)
(52) U.S. Cl. .................. 340/5.72; 340/426.1; 307/10.2
(58) Field of Classification Search ............ 340/425.5, 340/426.1, 426.34, 5.72; 726/22, 26, 34; 709/223; 307/10.1, 10.2
See application file for complete search history.

(56) References Cited

U.S. PATENT DOCUMENTS

| 5,229,648 | A | * | 7/1993 | Sues et al. ............... 307/10.2 |
| 5,596,317 | A | * | 1/1997 | Brinkmeyer et al. ....... 340/5.26 |
| 5,675,490 | A | * | 10/1997 | Bachhuber .................. 701/32 |
| 5,880,679 | A | * | 3/1999 | Lenart et al. ................ 340/5.6 |
| 5,982,894 | A | * | 11/1999 | McCalley et al. ......... 340/5.21 |
| 6,111,888 | A | * | 8/2000 | Green et al. ................ 370/461 |
| 6,587,030 | B2 | | 7/2003 | Bitzer |
| 6,885,289 | B1 | | 4/2005 | Nakai |

FOREIGN PATENT DOCUMENTS

| JP | 4-232147 A | 8/1992 |
| JP | 6-32204 A | 2/1994 |
| JP | 2002-59812 A | 2/2002 |
| WO | 98/26962 A1 | 6/1998 |
| WO | 02/01527 A1 | 1/2002 |

OTHER PUBLICATIONS

Communication dated Dec. 18, 2006 in Japanese Patent Application No. 2003-167728 with English translation.

* cited by examiner

*Primary Examiner*—Edwin C Holloway, III
(74) *Attorney, Agent, or Firm*—Harness, Dickey & Pierce, PLC

(57) ABSTRACT

An object of the invention is to provide a theft prevention system that appropriately protects a vehicle from being stolen. A communication ECU 3, an engine ECU 4, a car navigation system 5 and an air conditioner ECU 6, all installed on a vehicle 2, communicate each other to assure electrical connection, or 'communication.' When an abnormality is detected in terms of communication, both of the communicated device and the device that conducts communication check operation stop to work. If any one of the above devices is removed from the vehicle 2 while the vehicle 2 is stolen, this scheme of operation prevents the onboard devices from working correctly as a total system. Therefore, the scheme of operation greatly decreases motivation of theft, resulting in protecting the vehicle 2 appropriately from theft.

24 Claims, 6 Drawing Sheets

FIG. 2

| NAME OF DEVICE | COMMUNICATION CHECKED DEVICE | CONNECTION CHECK PATH |
|---|---|---|
| COMMUNICATION ECU | ENGINE ECU | FIRST COMMUNICATION LINE |
| | CAR NAVI. SYSTEM | FIRST COMMUNICATION LINE |
| | AIR-CONDITIONER ECU | FIRST COMMUNICATION LINE—CAR NAVI. SYSTEM—SECOND COMMUNICATION LINE |
| ENGINE ECU | COMMUNICATION ECU | FIRST COMMUNICATION LINE |
| | CAR NAVI. SYSTEM | FIRST COMMUNICATION LINE |
| | AIR-CONDITIONER ECU | FIRST COMMUNICATION LINE—CAR NAVI. SYSTEM—SECOND COMMUNICATION LINE |
| CAR NAVI. SYSTEM | COMMUNICATION ECU | FIRST COMMUNICATION LINE |
| | ENGINE ECU | FIRST COMMUNICATION LINE |
| | AIR-CONDITIONER ECU | SECOND COMMUNICATION LINE |
| AIR-CONDITIONER ECU | COMMUNICATION ECU | SECOND COMMUNICATION LINE—CAR NAVI. SYSTEM—FIRST COMMUNICATION LINE |
| | ENGINE ECU | SECOND COMMUNICATION LINE—CAR NAVI. SYSTEM—FIRST COMMUNICATION LINE |
| | CAR NAVI. SYSTEM | SECOND COMMUNICATION LINE |

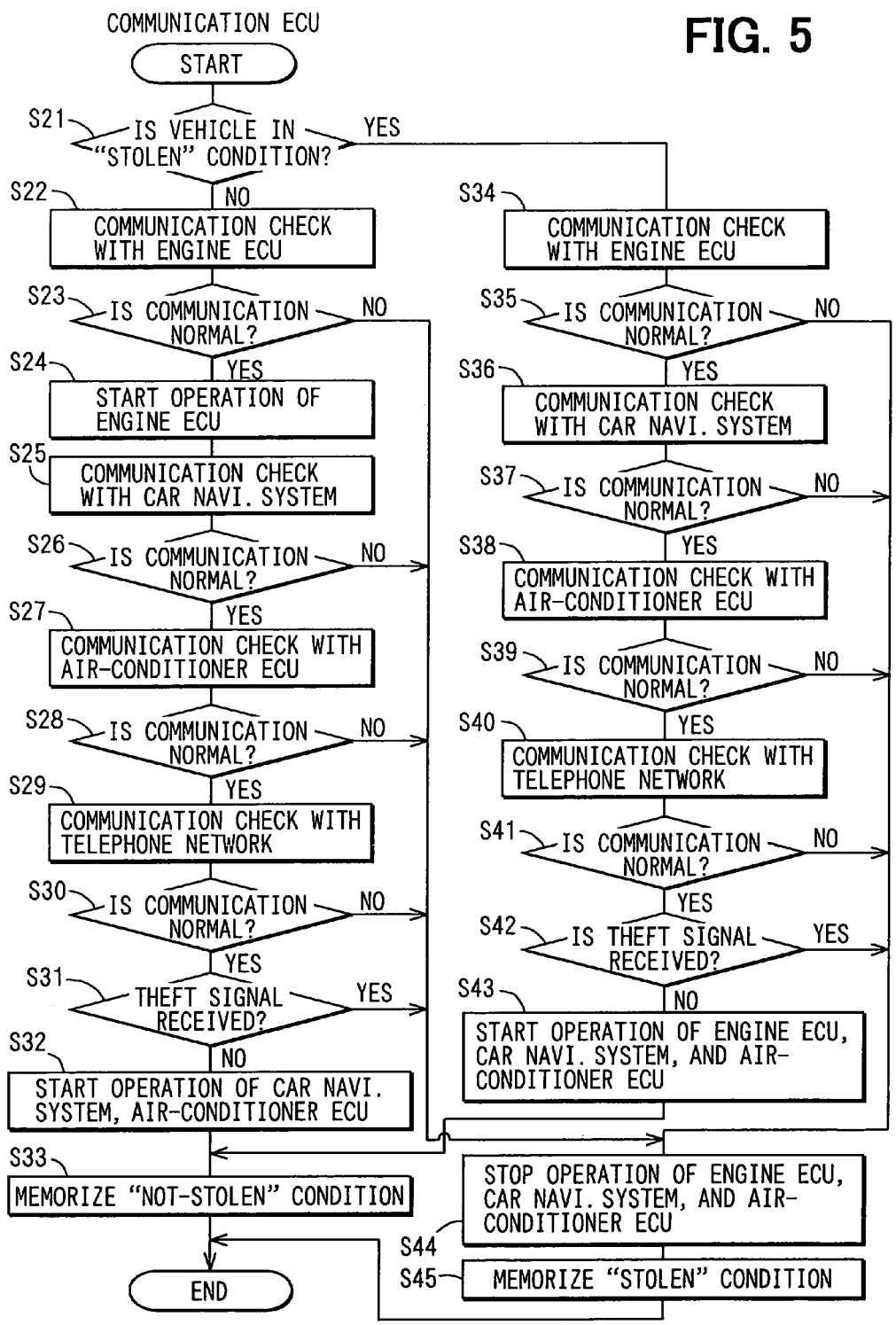

FIG. 6

| NAME OF DEVICE | ENCRYPTION KEY & DECRYPTION KEY |
|---|---|
| COMMUNICATION ECU | PUBLIC KEY SPECIFIC TO ENGINE ECU<br>PUBLIC KEY SPECIFIC TO CAR NAVI. SYSTEM<br>PUBLIC KEY SPECIFIC TO AIR-CONDITIONER ECU |
| ENGINE ECU | PRIVATE KEY SPECIFIC TO ENGINE ECU |
| CAR NAVI. SYSTEM | PRIVATE KEY SPECIFIC TO CAR NAVI. SYSTEM |
| AIR-CONDITIONER ECU | PRIVATE KEY SPECIFIC TO AIR-CONDITIONER ECU |

FIG. 7

| CONTROLLER | COMMUNICATION CHECKED DEVICE | CONTROLLED DEVICE |
|---|---|---|
| COMMUNICATION ECU | · ENGINE ECU<br>· CAR NAVI. SYSTEM<br>· AIR-CONDITIONER ECU | · COMMUNICATION ECU<br>· ENGINE ECU<br>· CAR NAVI. SYSTEM<br>· AIR-CONDITIONER ECU |
| ENGINE ECU | · COMMUNICATION ECU<br>· CAR NAVI. SYSTEM<br>· AIR-CONDITIONER ECU | · COMMUNICATION ECU<br>· ENGINE ECU<br>· CAR NAVI. SYSTEM<br>· AIR-CONDITIONER ECU |

ANTITHEFT SYSTEM

TECHNICAL FIELD

The present invention relates to an anti-theft system that prevents an object with onboard devices connected each other, such as a vehicle and the like, from stealing.

BACKGROUND ART

It is widely known that there exists an apparatus that prevents a vehicle from stealing by not allowing an engine to work when a theft signal is received from an anti-theft service center (For example, JP-A-2002-59812).

However, it can be foreseen that the apparatus using a prior art cannot appropriately enforce the expected functionality of preventing the vehicle from stealing when the apparatus itself is removed from the vehicle, that is, it cannot receive the theft signal from the anti-theft service center in order not to allow the engine to start.

In view of the foregoing problem, the anti-theft system of the present invention is aimed at providing a system that appropriately prevents the object with onboard devices such as a vehicle from stealing by steeply decreasing/deteriorating the motivation of theft.

DISCLOSURE OF INVENTION

In the anti-theft system of the present invention, one of the devices on an object with onboard devices such as a vehicle communicates with the rest of the onboard devices to check electrical connection before starting operation of itself and the rest of the onboard devices. If the electrical connection, or 'communication,' is not checked, the anti-theft system either stops operation of both of itself and other devices, or limits operation of both of them.

Therefore, abnormality of connection between one of the onboard devices and the other devices will be detected if the object with onboard devices is stolen and any one of the onboard devices connected to each other is removed from the object. This triggers either stopping of operation of the device and the other onboard devices, or alternatively enabling limited operation of the device and the other onboard devices, and causes the whole system as a group of devices not to work properly. Thus, the object with onboard devices with this anti-theft system attached appropriately discourages a thief from stealing the vehicle by making him/her think it's not worth stealing and deteriorating his/her motivation of theft.

In this case, a group of the onboard devices on the object with onboard devices may communicate with the other group of onboard devices, or every device on the object with onboard devices may communicate with other onboard devices for communication check operation. Further, object of communication check operation may be a portion of all onboard devices or may be all onboard devices. Furthermore, limited operation may be imposed only on the device itself that detected abnormality in communication check operation with other devices, or may be imposed only on the other devices.

When communication is checked respectivly between all of the onboard devices, it can detect any communication abnormality, that is, any removed device can be detected because of the loss of communication between the removed device and the not-removed devices. As a result, either the not-removed devices stop to work, or not-removed devices limit their own operation, and the group of devices as a system will be prevented from working properly. In this case, the object of communication check operation may also be a portion of all onboard devices or may be all onboard devices.

Communication between a device and the other device is preferably checked through an encrypted communication. In this manner, deciphering off communication check operation steps can be prevented, and thus security of the system can be raised. Symmetric-key cryptography or public key cryptography can be used for this purpose.

One of the onboard devices may be set as the controller to check communication with the other onboard devices. In this manner, control of communication check operation can be simplified compared to the communication check operation that every onboard device communicates with each other, and thus the system can easily be constructed.

One of the onboard devices set as the controller holds a public key for a corresponding device, and the corresponding device holds a private key coupled with the public key stored in the device set as the controller. By using these keys, that is, with a public key in the controller and a private key in the corresponding device, communication check operation between these two devices can be executed through an encrypted communication.

In this manner, steps of communication check operation and the like can safely be kept secret and security of the system can be raised even when the controller is removed and the public key in the controller is decoded, because the corresponding device holds its own private key.

One of the onboard devices set as the controller preferably has a communication function with an external facility. In this manner, the onboard device set as the controller can receive, for example, a theft signal sent from an anti-theft service center by using a telephone network.

One of the onboard devices set as the controller preferably checks communication with other onboard devices based on a priority order of the rest of the onboard devices. In this manner, communication check operation with certain onboard devices can be executed prior to the communication check operation with the rest of the onboard devices.

One of the onboard devices set as the controller checks communication with a portion of the rest of the onboard devices first, and then checks communication with all of the other onboard devices after detecting normal communication check operation with the portion of the rest of the onboard devices and starting operation of the portion of the rest of the onboard devices. In this manner, communication with the engine ECU, for example, can be checked prior to the rest of the onboard devices, and thus usefulness of the system can be improved by starting the engine ECU advantageously before checking communication with the other devices.

An onboard device set as the controller preferably checks communication with the other onboard devices at predetermined intervals that are longer than a minimum threshold and shorter than a maximum threshold. When communication check operation is conducted more often than necessary, that may be taken advantage of by a thief for deciphering the encrypted code of steps used for communication check operation. With regard to this problem, checking communication in a predetermined interval longer than the minimum threshold can decrease the chance of deciphering the steps of communication check operation by a thief. In addition, when communication is checked less frequently than necessary, that may give a thief a longer period of time for misusing removed devices when onboard devices are removed from the vehicle. With regard to this problem, checking communication in a predetermined interval shorter than the maximum threshold can protect the removed device from being misuse by a thief for longer period of time.

The other onboard devices may stop their own operation or may limit their own operation when communication is checked in an interval longer than a maximum threshold by the device set as the controller, or in an interval shorter than a minimum threshold. In this manner, the other onboard devices can appropriately stop their own operation or limit their own operation even when communication by the device set as the controller cannot be checked properly because of a dishonest act.

The other devices are preferably programmed to invoke communication check operation by a device set as the controller when communication is not checked by the controller for more than a predetermined period of time. In this manner, the system can prevent the rest of the devices from being neglected for not checking communication for a predetermined period of time with the device set as the controller. That is, failure of communication check operation with the other onboard devices, for example, caused by a drop of voltage of an entire system can be prevented when the voltage of the entire system drops.

PREFERRED EMBODIMENT

First Embodiment

The first embodiment of the present invention, that is, an application of the present invention to a system comprising onboard devices, is described here with reference to FIG. 1 to FIG. 4. The first embodiment corresponds to the claim 1 to claim 3.

FIG. 1 shows a structural diagram of the entire system. The anti-theft system 1 comprises a communication ECU 3, an engine ECU 4, a car navigation system 5, and an air-conditioner ECU 6 connected each other on a vehicle 2 (an object with onboard devices in the present invention). A first communication line 7 connects the communication ECU 3, the engine ECU 4, and the car navigation system 5, and a second communication line 8 connects the car navigation system 5 and the air-conditioner ECU 6.

Each of those devices, that is, the communication ECU 3, the engine ECU 4, the car navigation system 5, and the air-conditioner ECU 6, checks an electrical connection, or 'communication' with other onboard devices. In this case, the communication ECU 3 checks communication with the engine ECU 4 through the first communication line 7. The communication ECU 3 also checks communication to the car navigation system through the first communication line 7. Further, the communication ECU 3 checks communication to the air-conditioner 6 through the first communication line 7, the car navigation system 5 and the second communication line 8.

In the same manner as described above, each of the following devices, that is, the engine ECU 4, the car navigation ECU 5, the air-conditioner ECU 6, checks communication to the other devices. FIG. 2 shows a list of communication check operation relationships, and communication check operation paths of each of the onboard devices to the controller. In terms of communication check operation, each of the following devices, that is, the communication ECU 3, the engine ECU 4, the car navigation system 5, and the air-conditioner ECU 6 checks communication by using data communication. When data communication successfully completes, it is detected as normal communication, and when data communication does not complete, it is regarded as a communication failure.

In the operation scheme described above, the communication ECU 3 sends a current location signal to the anti-theft service center 9 upon receiving a theft signal through the telephone network when the vehicle 2 is under "theft" condition.

Next, the operation of the above-described scheme is explained with reference to FIG. 3 and FIG. 4. In this case, the communication ECU 3 is taken as a example to assure communication with other devices. The communication ECU 3 checks communication with the engine ECU 4 through the first communication line 7 (step S1). When the communication ECU 3 detects a successful data communication with the engine ECU 4, it determines that communication between the communication ECU 3 and the engine ECU 4 is normal (step S2: YES).

Next, the communication ECU 3 checks communication with the car navigation system 5 through the first communication line 7 (step S3). When the communication ECU 3 detects a successful data communication with the car navigation system 5, it determines that communication between the communication ECU 3 and the car navigation system 5 is normal (step S4: YES).

Next, the communication ECU 3 checks communication with the air-conditioner ECU 6 through the first communication line 7, the car navigation system 5, and the second communication line 8 (step S5). When the communication ECU 3 detects a successful data communication with the air-conditioner ECU 6, it determines that communication between the communication ECU 3 and the air-conditioner ECU 6 is normal (step S6: YES).

Next, the communication ECU 3 checks communication with telephone network (step S7). When the communication ECU 3 detects a normal communication with the telephone network (step S8: YES), it determines if a theft signal is received from the anti-theft service center 9 through the telephone network (step S9). When the communication ECU 3 detects that there is no theft signal sent out from the anti-theft service center (step S9: NO), it outputs a normal operation signal to operate the engine ECU 4, the car navigation system 5, and the air-conditioner ECU 6 (step S10).

On the other hand, when an abnormality is detected in the communication between the communication ECU 3 and the engine ECU 4 (step S2: NO), or between the communication ECU 3 and the car navigation system 5 (step S4: NO), or between the communication ECU 3 and the air-conditioner ECU 6 (step S6: NO), the communication ECU 3 sends a stop operation signal in order to stop operation of the engine ECU 4, or the car navigation system 5, or the air-conditioner ECU 6 (step S11).

When an abnormality is detected in the communication between the communication ECU 3 and the telephone network (step S8: NO), or a reception of a theft signal from the anti-theft service center 9 is detected (step S9: YES), the communication ECU 3 also outputs a stop operation signal in order to stop operation of the engine ECU 4, or the car navigation system 5, or the air-conditioner ECU 6 (step S11).

Through the processes described above, the communication ECU 3 normally operates the engine ECU 4, the car navigation system 5, and the air-conditioner ECU 6 under the condition that the communication with these devices and with the telephone network are normal and there is no theft signal sent out from the anti-theft service center 9. On the contrary, the communication ECU 3 stops operation of the engine ECU 4, the car navigation system 5, and the air-conditioner ECU 6 when the communication with the devices or with the telephone network is not normal, or there is a theft signal sent out from the anti-theft service center 9.

In the cases described above, the communication ECU 3 can also output a limited operation signal to limit the operation of the engine ECU 4, the car navigation system, and the air-conditioner ECU 6 instead of stopping operation of these devices. Further, the communication ECU 3 operates itself normally when the communication with the other devices is normal, and it can either stop its own operation or restrict its own operation when the communication with the other devices is not normal.

The details of the communication check operation described above are explained in the following. In FIG. 4, steps of communication check operation between the communication ECU 3 and the engine ECU 4 are taken as an exemplary case.

The communication ECU 3 creates a random number X1 (step T1), and sends a signal m1 including the random number X1 to the engine ECU 4. Upon receiving the signal m1 from the communication ECU 3, the engine ECU 4 extracts the random number X1 from the signal m1, and encrypts the random number X1 to create a random number X2 (step T2), and creates a random number Y1 (step T3). Next, the engine ECU 4 sends a signal m2 including the random number X2 and Y1 to the communication ECU 3.

Upon receiving the signal m2 from the engine ECU 4, the communication ECU 3 extracts the random number X2 and Y1 from the signal m2, and determines if encryption is normally executed in the engine ECU 4 by distinguishing the random number X2 (step T4). When the communication ECU 3 detects a normal encryption in the engine ECU 4, it encrypts the random number Y1 to create a random number Y2 (step T5), and sends a signal m3 including the random number Y2 to the engine ECU 4.

Upon receiving the signal m3 from the communication ECU 3, the engine ECU 4 extracts the random number Y2 from the signal m3, and determines if encryption was normally executed in the communication ECU 3 by distinguishing the random number Y2 (step T6). When the engine ECU 4 detects a normal encryption in the communication ECU 3, it sends a signal m4 to the communication ECU 3. The communication ECU 3 detects a normal data communication with the engine ECU 4 by receiving the signal m4 from the engine ECU 4, and this completes the communication check operation between the communication ECU 3 and the engine ECU 4.

The communication ECU 3 checks communication with the engine ECU 4 through encryption of data communication in the steps described above, and it checks communication with the car navigation system 5 and the air-conditioner ECU 6 in the same manner through encryption of data communication. Communication check operation between other devices is executed in the same manner through encryption of data communication.

The random number X1 and Y1 can effectively encrypt data for communication check operation when they are randomly created in every communication check operation. To be more precise, the above scheme can be materialized when the communication ECU 3 and the engine ECU 4 store multiple random numbers in their memories, and inform the random number they use each other in every communication check operation session. The alternative way of determining the random number is that predetermined sequential order of random numbers are kept in a non-volatile memory and the random number is retrieved according to the order between the communication ECU 3 and the engine ECU 4.

In the first embodiment of the present invention, the operation scheme of the anti-theft system is so programmed that the operation of the other device is stopped when an abnormality is detected in the communication check operation process conducted by each of the onboard devices of the vehicle 2, that is, the communication ECU 3, the engine ECU 4, the car navigation system 5, and the air-conditioner ECU 6. When the vehicle 2 is stolen and one of the onboard devices is removed, the total system of the onboard devices will be prevented from working properly. As a result, that makes a thief think it is not worth stealing, and thus motivation of theft will be greatly decreased. That consequently protects the vehicle 2 from stealing in an appropriate way. In addition, steps of communication check operation are protected by the encrypted data of communication check operation between the onboard devices, and thus security of the anti-theft system is improved.

Second Embodiment

Next, the second embodiment of the present invention is described with reference to the FIG. 5 and FIG. 6. In this description, the same portion as described in the first embodiment is omitted, and only the difference is described. The second embodiment corresponds to the claims 1, 4 and 11.

In the first embodiment, each of the following devices, that is, the communication ECU 3, the engine ECU 4, the car navigation system 5, and the air-conditioner ECU 6 is programmed to assure communication with other devices. In the second embodiment, the communication ECU 3 checks communication with the engine ECU 4, the car navigation system 5, and the air-conditioner ECU 6, and the communication check operation by the engine ECU 4, the car navigation system 5, and the air-conditioner ECU 6 is eliminated. In other words, the communication ECU 3 is programmed as a controlling device of the present invention.

In this scheme of operation, the communication ECU 3 determines in the first place if the vehicle 2 is in a stolen condition or not (step S21). If the vehicle is determined as not in a stolen condition (step S21: NO), the communication ECU 3 checks communication with the engine ECU 4 (step S22). When the communication check operation with the engine ECU 4 is determined as normal (step S23: YES), the communication ECU 3 outputs normal operation signal to the engine ECU 4 to operate the engine ECU 4 before checking communication with the car navigation system 5 and the air-conditioner ECU 6 (step S24).

Next, the communication ECU 3 checks communication with the car navigation system 5 (step S25). When the communication check operation with the car navigation system is determined as normal (step S26: YES), the communication ECU 3 checks communication with the air-conditioner ECU 6 (step S27). When the communication check operation with the air-conditioner ECU 6 is determined as normal (step S28: YES), the communication ECU 3 checks communication with the telephone network (step S29).

When the communication check operation with the telephone network is determined as normal (step S30: YES), the communication ECU 3 determines if theft signal is received from the anti-theft service center 9 through the telephone network (step S31). When the theft signal is not received from the anti-theft service center 9 (step S31: NO), the communication ECU 3 outputs normal operation signal to the car navigation system 5 and the air-conditioner ECU 6 to operate these devices (step S32), and memorizes that the vehicle 2 is not in a stolen condition (step S33).

On the contrary, the communication ECU 3 follows the processes of step S34 through step S44 corresponding to the step S1 through step S11 described in the first embodiment when the vehicle 2 is determined as in a stolen condition (step S21 : YES), and memorizes that the vehicle 2 is in a stolen condition.

By executing the processes described above, the communication ECU 3 uses a different scenario as used in the first embodiment to start operation of the engine ECU 4 before checking communication with the car navigation system 5 and the air-conditioner ECU 6 when the communication check operation with the engine ECU 4 is determined as normal. In this manner, the engine ECU 4 can be started in the first place without delay.

In the second embodiment, the communication is checked through encryption of data communication. As shown in FIG. 6, the communication ECU 3 holds the specific public key for the engine ECU 4, the car navigation system 5, and the air-conditioner ECU 6, and corresponding private keys are held by the engine ECU 4, the car navigation system 5, and the air-conditioner ECU 6. When communication with the engine ECU 4 is checked, the communication ECU 3 uses the specific public key for the engine ECU 4 to encode data and sends it to the engine ECU 4. The engine ECU 4 decrypts the data from the communication ECU 3 by using a corresponding private key for the engine ECU 4.

In the second embodiment, the communication ECU 3 is programmed to assure communication with other onboard devices at predetermined intervals that are longer than a minimum threshold and shorter than a maximum threshold. In this case, the lower limit and the upper limit of the predetermined interval can either be determined by the system itself or can be set by the user of the system. When communication is checked in an interval either longer than the maximum threshold or shorter than the minimum threshold, that is, timing of communication check operation is abnormal, each of the following devices, the engine ECU 4, the car navigation system 5, and the air-conditioner ECU 6, is so programmed as to stop their own operation or limit their own operation.

Besides, the engine ECU 4, the car navigation system 5, and the air-conditioner ECU 6 are programmed to assure communication when communication checked by the communication ECU 3 is not started in a predetermined period of time. In this case, the predetermined period of time may be defined by the system itself or may be determined by the user of the system.

As described above, among the onboard devices on the vehicle 2, the communication ECU 3 checks communication with other devices such as the engine ECU 4, the car navigation system 5, and the air-conditioner ECU 6 in the second embodiment of the system. When an abnormality is detected during the communication check operation, the system is programmed to stop operation of the other onboard devices. Therefore, if any one of the onboard devices is removed from the vehicle 2 in a stolen condition, that scheme of operation prevents the system to work properly as a group of devices. As a result, a thief thinks that it is not worth stealing the vehicle 2, and motivation of theft will be deteriorated to appropriately protect the vehicle 2 from theft.

When only the communication ECU 3 is programmed to assure communication with the other onboard devices, that is, the engine ECU 4, the car navigation system 5, and the air-conditioner ECU 6, control of the anti-theft system can be simplified and easily be constructed compared to the scheme of operation in the first embodiment. Further, the communication ECU 3 holding the specific public key for each of the other onboard devices, and the engine ECU 4, the car navigation system 5, and the air-conditioner ECU 6 holding their own private keys, the system is programmed to assure communication through encryption of data communication with these public keys and private keys. Therefore, security of the system is improved and the steps of communication check operation cannot be easily decrypted because the private key of the encryption is held by the other onboard device even when the communication ECU 3 is removed from the vehicle 2 and the public key of the communication ECU 3 is deciphered.

When the communication check operation with the engine ECU 4 is determined as normal, the communication ECU 3 outputs normal operation signal to the engine ECU 4 to operate the engine ECU 4 before checking communication with the car navigation system 5 and the air-conditioner ECU 6. This scheme of operation enables the system to start the engine ECU 4 in the first place without delay and usefulness of the system is improved.

Further, the communication ECU 3 is programmed to assure communication with other onboard devices at predetermined intervals that are longer than a minimum threshold and shorter than a maximum threshold. When communication is checked more often than necessary, that can be utilized by a thief to decipher the encrypted code of steps used for communication check operation. With regard to this problem, checking communication in a predetermined interval longer than the minimum threshold can decrease the chance of deciphering the steps of communication check operation by a thief. In addition, when communication is checked less infrequently than necessary, that may give a thief a longer period of time for using removed devices when onboard devices are removed from the vehicle 2. With regard to this problem, checking communication in a predetermined interval shorter than the maximum threshold can prevent the thief from misusing the removed devices.

Further, the devices such as the engine ECU 4, the car navigation system 5, and the air-conditioner ECU 6 is programmed either to stop their own operation or to limit their operation when communication is checked in an interval longer than the predetermined maximum period by the communication ECU 3, or in an interval shorter than the predetermined minimum period. In this manner, the engine ECU 4, the car navigation system 5, and the air-conditioner ECU 6 can appropriately stop their own operation or limit their own operation even when communication check operation by the communication ECU 3 cannot be executed properly because of a dishonest act.

Further, the engine ECU 4, the car navigation system 5, and the air-conditioner ECU 6 are programmed to invoke communication check operation by the communication ECU 3 when the communication is not checked for a predetermined period of time. In this manner, the system can prevent the engine ECU 4, the car navigation system 5, and the air-conditioner ECU 6 from being neglected by not checking communication for a predetermined period of time.

Third embodiment

Next, the third embodiment is described with reference to FIG. 7. The same portion as described in the second embodiment is eliminated and only the different portion is described. In the second embodiment, only the communication ECU 3 is checking the communication as a controlling device. In the third embodiment, the communication ECU 3 and the engine ECU 4 are regarded as controlling devices to assure communication.

In this case, both the communication ECU 3 and the engine ECU 4 will be controlling the car navigation system 5 and the air-conditioner ECU 6, and degree of restricted operation of the car navigation system 5 and the air-conditioner ECU 6 will be determined by a policy that a greater restriction overrides a smaller one. Therefore, the engine ECU 4 can work as a controlling device even when the communication ECU 3 cannot be used as a controlling device because of the revelation of the internal structure, and thus can prevent the onboard devices from operating properly as described in the first and second embodiment. As a result, this scheme of operation makes a thief think that it's not worth stealing the vehicle and deteriorate motivation of theft, protecting the vehicle from stealing appropriately.

Other Embodiment

The present invention is not limited to the above embodiments, but can be modified or enhanced in the following.

The scheme of operation is not only applicable to the onboard devices of a vehicle but also applicable to the devices mounted on the other types of apparatus.

When communication check operation function is installed in every device, the wire-harness connecting between those devices can also be modified to have a proprietary structure to accommodate a different number of signals and the like. In this manner, the proprietary structure of the wire-harness will appropriately prevent the vehicle 2 from stealing by deteriorating the motivation of theft, and spread of damage can also be suppressed when the onboard devices are removed from the vehicle 2 while it is being stolen.

BRIEF DESCRIPTION OF DRAWINGS

FIG. 2 shows a diagram that represents connected devices to each onboard device that are the object of communication check operation and communication check operation path to those devices.

FIG. 5 shows a flow chart that represents the second embodiment of the present invention.

FIG. 6 shows a public key and a private key of each of the onboard devices.

FIG. 7 shows a diagram that represents relation between controlling devices, connected devices (objects of communication check operation), and controlled devices.

Figure 1:
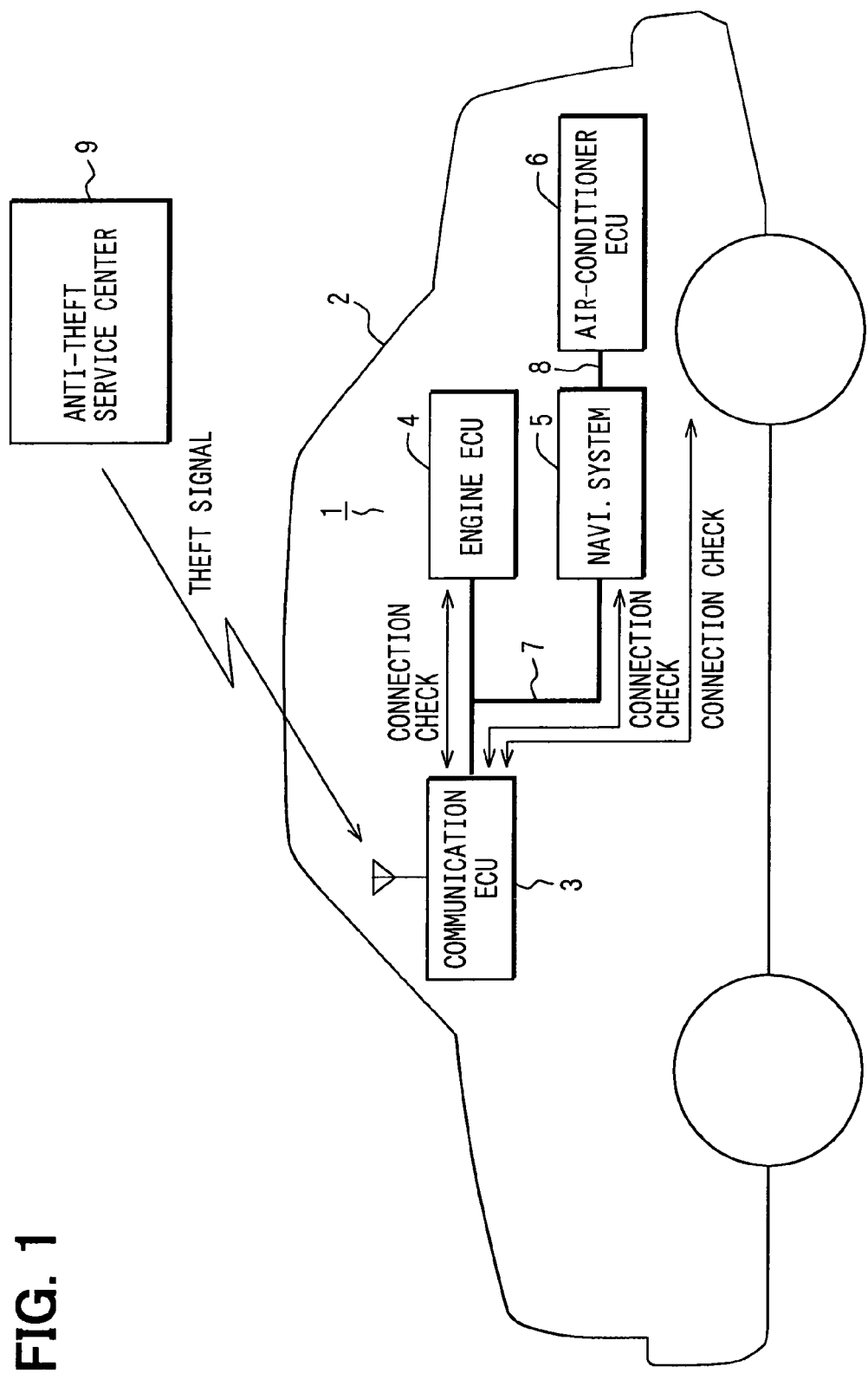
FIG. 1 shows a schematic diagram of the first embodiment of the present invention.
Figure 3:
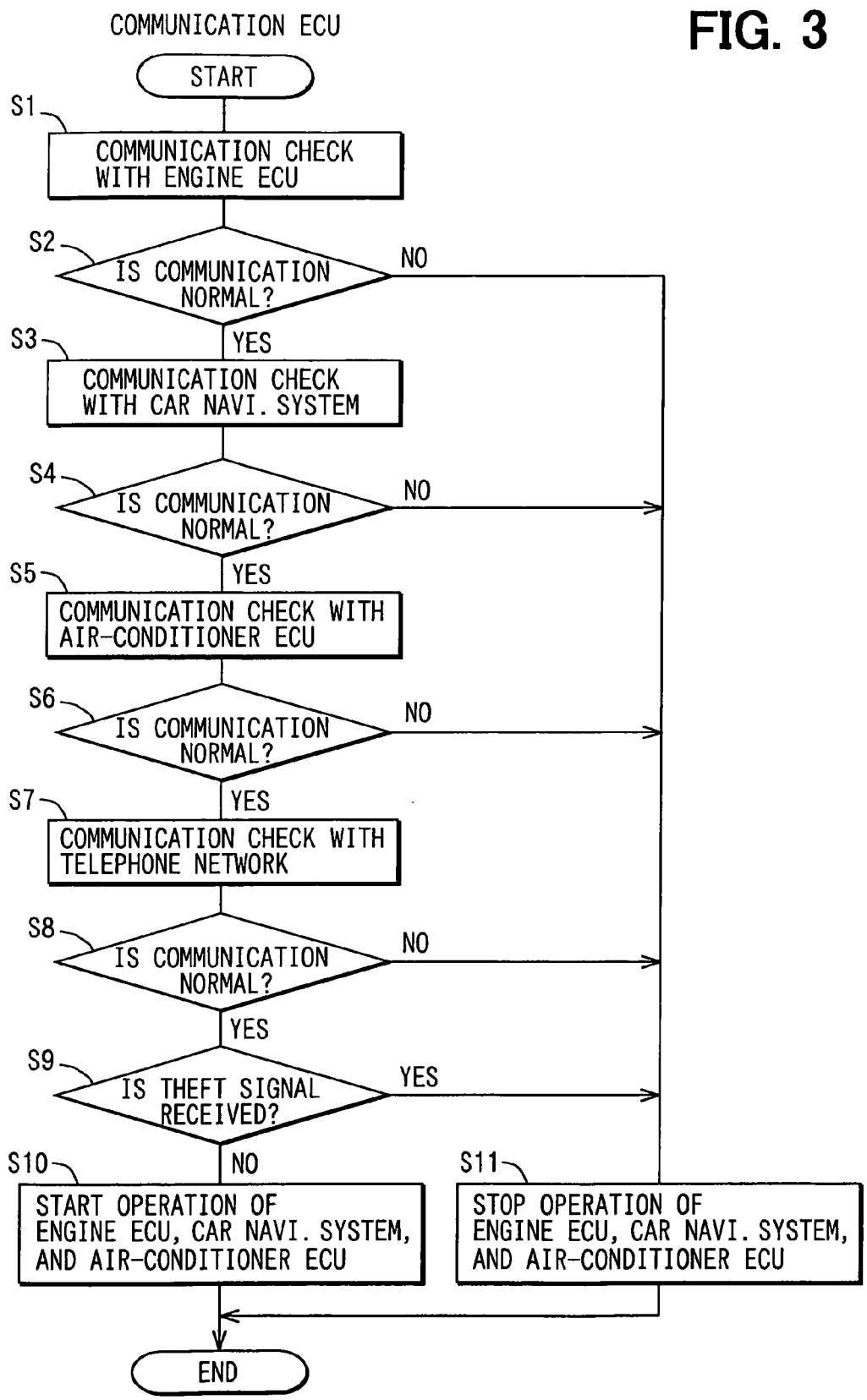
FIG. 3 shows a flow chart that represents how the communication ECU 3 checks communication with other onboard devices.
Figure 4:
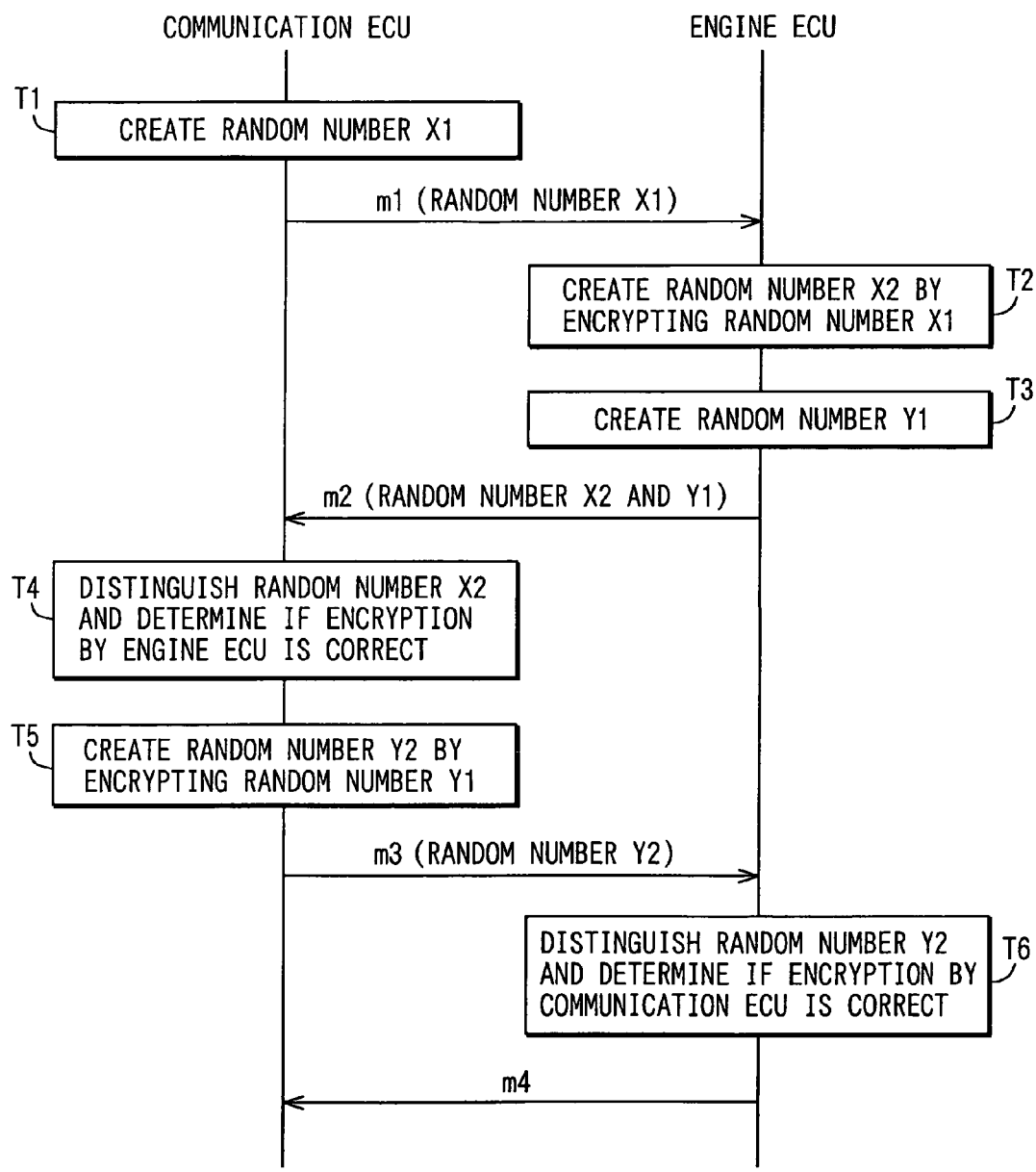
FIG. 4 shows a flow chart that represents how the communication ECU 3 checks communication with the engine ECU 4.

The invention claimed is:

1. An anti-theft system that limits stealing of a vehicle having a plurality of interconnected onboard devices, wherein:
   a first onboard device performs a communication check operation for checking communication conditions with at least one of the rest of the plurality of onboard devices;
   when the communication check operation by the first onboard device is normal, the first onboard device and the rest of the plurality of onboard devices operate normally; and
   when the communication check operation by the first onboard device is abnormal, the first onboard device limits the operation of the first onboard device and the first onboard device limits operation of all of the rest of the plurality of onboard devices causing the plurality of onboard devices to not work properly.

2. The anti-theft system according to claim 1, wherein all of the onboard devices respectively perform the communication check operation with the rest of the onboard devices.

3. The anti-theft system according to claim 1, wherein the communication check operation between the first onboard device and the at least one of the rest of the onboard devices is performed through encryption of data communicated therebetween.

4. The anti-theft system according to claim 1, wherein the first the onboard device is set as a controller and performs the communication check operation with rest of the onboard devices.

5. The anti-theft system according to claim 4, wherein:
   the first onboard device, which is set as the controller, stores a plurality of public keys, each of which is specific to a corresponding one of the rest of the onboard devices;
   each of the rest of the onboard devices stores its own specific private key, which is paired with the corresponding specific public key; and
   the communication check operation between the first onboard device, which is set as the controller, and the at least one of the rest of the onboard devices is performed through encryption of data communicated therebetween, wherein the encryption of the data is performed through use of the private keys stored in the at least one of the rest of the onboard devices and the public keys stored in the first onboard device, which is set as the controller.

6. The anti-theft system according to claim 4, wherein the first onboard device, which is set as the controller, has a communication capability for performing external communication.

7. The anti-theft system according to claim 4, wherein the first onboard device, which is set as the controller, performs the communication check operation with the at least one of the rest of the onboard devices based on a priority order of the rest of the onboard devices.

8. The anti-theft system according to claim 7, wherein:
   when the first onboard device, which is set as the controller, detects that the communication between the first onboard device and the at least one of the rest of the onboard devices is normal, the first onboard device, which is set as the controller, enables normal operation of the at least one of the rest of the onboard devices and then performs the communication check operation with the remaining one or more of the rest of the onboard devices.

9. The anti-theft system according to claim 4, wherein the first onboard device, which is set as the controller, performs the communication check operation with the at least one of the rest of the onboard devices at preset intervals, which are longer than a predetermined minimum threshold interval and are shorter than a predetermined maximum threshold interval.

10. The anti-theft system according to claim 9, wherein when the communication check operation is performed by the first onboard device, which is set as the controller, at intervals that are longer than the predetermined maximum threshold interval or shorter than the predetermined minimum threshold interval, the rest of the onboard devices stop their own operation or perform their own limited operation.

11. The anti-theft system according to claim 4, wherein when the communication check operation with the at least one of the rest of the onboard devices is not performed by the first onboard device, which is set as the controller, for more than a predetermined time period, the at least one of the rest of the onboard devices request the first onboard device, which is set as the controller, to perform the communication check operation with the at least one of the rest of the onboard devices.

12. An anti-theft system that limits stealing of a vehicle having a plurality of interconnected onboard devices, wherein:
- a first onboard device performs a removal check operation for checking removal of at least one of the rest of the plurality of onboard devices from the vehicle;
- when the removal check operation by the first onboard device is normal, the first onboard device enables normal operation of the first onboard device; and
- when the removal check operation by the first onboard device is abnormal, the first onboard device limits operation of all of the remaining onboard devices but does not stop operation of all of the rest of the onboard devices causing all of the remaining onboard devices to not work properly.

13. The anti-theft system according to claim 12, wherein all of the onboard devices respectively perform the communication check operation with the rest of the onboard devices.

14. The anti-theft system according to claim 12, wherein the communication check operation between the first onboard device and the at least one of the rest of the onboard devices is performed through encryption of data communicated therebetween.

15. The anti-theft system according to claim 12, wherein the first onboard device is set as a controller and performs the communication check operation with rest of the on board devices.

16. The anti-theft system according to claim 15, wherein:
- the first the onboard device, which is set as the controller, stores a plurality of public keys, each of which is specific to a corresponding one of the rest of the onboard devices;
- each of the rest of the on board devices stores its own specific private key, which is paired with the corresponding specific public key; and
- the communication check operation between the first onboard device, which is set as the controller, and the at least one of the rest of the on board devices is performed through encryption of data communicated therebetween, wherein the encryption of the data is performed through use of the private keys stored in the at least one of the rest of the onboard devices and the public keys stored in the first onboard device, which is set as the controller.

17. The anti-theft system according to claim 15, wherein the first onboard device, which is set as the controller, has a communication capability for performing external communication.

18. The anti-theft system according to claim 15, wherein the first onboard device, which is set as the controller, performs the communication check operation with the at least one of the rest of the on board devices based on a priority order of the rest of the onboard devices.

19. The anti-theft system according to claim 18, wherein:
- when the first onboard device, which is set as the controller, detects that the communication between the first onboard device and the at least one of the rest of the onboard devices is normal, the first onboard device, which is set as the controller, enables normal operation of the at least one of the rest of the onboard devices and then performs the communication check operation with the remaining one or more of the rest of the onboard devices.

20. The anti-theft system according to claim 15, wherein the first onboard device, which is set as the controller, performs the communication check operation with the at least one of the rest of the onboard devices at preset intervals, which are longer than a predetermined minimum threshold interval and are shorter than a predetermined maximum threshold interval.

21. The anti-theft system according to claim 20, wherein when the communication check operation is performed by the first onboard device, which is set as the controller, at intervals that are longer than the predetermined maximum threshold interval or shorter than the predetermined minimum threshold interval, the rest of the onboard devices stop their own operation or perform their own limited operation.

22. The anti-theft system according to claim 15, wherein when the communication check operation with the at least one of the rest of the onboard devices is not performed by the first onboard device, which is set as the controller, for more than a predetermined time period, the at least one of the rest of the onboard devices request the first onboard device, which is set as the controller, to perform the communication check operation with the at least one of the rest of the onboard devices.

23. The anti-theft system according to claim 1, wherein the first onboard device outputs a signal to all of the rest of the plurality of onboard devices to limit their operation.

24. The anti-theft system according to claim 12, wherein the first onboard device outputs a signal to all of the rest of the plurality of onboard devices to limit their operation.

* * * * *

UNITED STATES PATENT AND TRADEMARK OFFICE
CERTIFICATE OF CORRECTION

PATENT NO.       : 7,626,487 B2
APPLICATION NO.  : 10/535980
DATED            : December 1, 2009
INVENTOR(S)      : Haruhiko Ogiso It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Second Day of November, 2010

David J. Kappos
*Director of the United States Patent and Trademark Office*